3,733,223
NEAR INFRARED ILLUMINATING COMPOSITION
Carl W. Lohkamp, Bloomfield, Ind., assignor to the United States of America as represented by the Secretary of the Navy
No Drawing. Filed May 22, 1972, Ser. No. 255,333
Int. Cl. C06d 1/10
U.S. Cl. 149—19                                                    4 Claims

ABSTRACT OF THE DISCLOSURE

An illuminating composition which, upon burning, produces infrared radiation in the 0.74–1.2 micron region of the spectrum. The produced radiation can be utilized to produce irradiance upon a target to improve the range and resolution of a night viewing device. The composition is comprised of silicon, hexamethylenetetramine, an epoxy binder, and an alkali metal nitrate selected from the group consisting of potassium nitrate, cesium nitrate and rubidium nitrate.

BACKGROUND OF THE INVENTION

The present invention relates to the production of infrared radiation by chemical means, and more particularly to the production of radiation in the 0.74–1.2 micron region of the spectrum with little visible light emission. This radiation may be utilized to produce irradiance upon a target being viewed with an image intensifier night viewing device and the irradiance greatly improves the range and resolution of these night viewing devices.

In the past, filtered search lights have been used to irradiate targets, however, there are various disadvantages to the use of search lights in a combat area. Search light systems are heavy and cumbersome and also require a source of power. Also the usefulness of search lights is affected by scattering as the radiation has to travel to the target, be reflected, and return.

SUMMARY OF THE INVENTION

The present invention relates to an illuminating composition which, when burned, will produce infrared radiation in the 0.74–1.2 micron region of the spectrum with little visible light emission. The composition is comprised of silicon, hexamethylenetetramine, an epoxy binder and an alkali metal nitrate selected from the group consisting of potassium nitrate, rubidium nitrate and cesium nitrate. The composition is pressed into a tube to make a pyrotechnic candle.

DESCRIPTION OF THE PREFERRED EMBODIMENT

The near infrared illuminating composition of the present invention is comprised, by weight, of between 5 and 45 percent of silicon, between 5 and 30 percent of hexamethylenetetramine, between 2 and 20 percent of an epoxy binder and between 20 and 80 percent of an alkali metal nitrate. The composition is pressed into tubes at a pressure between 4,000 and 10,000 pounds per square inch and the candles formed can be placed in any conventional illuminating projectile or air-dropped illuminating round. The candle, during combustion, produces the desired radiation by emission from its reaction. The majority of the emission is due to atomic excitation-transition emission (line emission) and from molecular band emission. For maximum emission of a wavelength of 0.76 micron, potassium nitrate is used as the oxidizing material and for maximum emission in the 0.77–0.80 micron region, rubidium nitrate is used. When cesium nitrate is used in the composition, burning of the candle produces maximum emission in the 0.85–1.2 micron region.

The following examples will serve to further illustrate the present invention but are not meant to limit it thereto.

EXAMPLE I

|  | Percent (by weight) |
|---|---|
| Silicon | 10 |
| Potassium nitrate | 70 |
| Hexamethylenetetramine ($C_6H_{12}N_4$) | 16 |
| Epoxy resin (D.E.R. 321) | 2.8 |
| Epoxy hardener (D.E.H. 14) | 1.2 |

The epoxy material is mixed with the silicon and then the other ingredients are added and thoroughly mixed. The composition was pressed at 4000 p.s.i. to form a candle approximately 1¼ inches in diameter and 1¼ inches in length. The candle was then cured at room temperature for 48 hours. The candle burned for about 1½ minutes and produce infrared radiation having a maximum emission at 0.76 microns.

The epoxy resin and hardener were obtained from The Dow Chemical Company, Midland, Mich. The resin and hardener are marketed by The Dow Chemical Companyl under the trademarks D.E.R. 321 and D.E.H. 14. The epoxy resin is a liquid epoxy resin of the Bisphenol A epichlorohydrin type containing cresyl glycidyl ether.

EXAMPLE II

|  | Percent (by weight) |
|---|---|
| Silicon | 10 |
| Rubidium nitrate | 60.8 |
| Hexamethylenetetramine ($C_6H_{12}N_4$) | 23.2 |
| Epoxy resin (D.E.R. 321) | 4.2 |
| Epoxy hardener (D.E.H. 14) | 1.8 |

The ingredients were mixed and pressed as in Example I to produce a candle 1¼ inches in diameter and 1¼ inches in length. The candle burned for about 1½ minutes and produced infrared radiation having maximum emission in the 0.77–0.80 micron region.

EXAMPLE III

|  | Percent (by weight) |
|---|---|
| Silicon | 16.3 |
| Cesium nitrate | 78.7 |
| Epoxy resin (D.E.R. 321) | 3.3 |
| Epoxy hardener (D.E.H. 14) | 1.7 |

The ingredients were mixed and pressed as in Example I to produce a candle 1¼ inches in diameter and 1¼ inches in length. The candle burned for about 30 seconds and produced infrared radiation having maximum emission in the 0.85–1.2 micron region.

Burning of the candles produced in the above examples generated near infrared emission with little visible emission. The hexamethylenetetramine serves as a burning rate controller and slows up the burning time for the candle. The candle produced in Example III did not contain any hexamethylenetetramine and burned three times faster than the candles produced in Examples I and II.

I claim:
1. An illuminating flare composition for generating near infrared radiation having wave length in the .76 to 1.2 micron region of the spectrum with little visible emission comprised of
  between 5 and 45 percent, by weight, of silicon,
  between 20 and 80 percent, by weight, of an alkali metal nitrate selected from the group consisting of potassium nitrate, cesium nitrate and rubidium nitrate, between 5 and 30 percent, by weight, of hexamethylenetetramine, and between 2 and 20 percent, by weight, of epoxy binder.

2. An illuminating flare composition as set forth in claim 1 wherein said alkali metal nitrate is potassium nitrate and said composition upon burning generates maximum emission at 0.76 micron.

3. An illuminating flare composition as set forth in claim 1 wherein said alkali metal nitrate is rubidium nitrate and said composition upon burning generates maximum emission in the .77 to .80 micron region of the spectrum.

4. An illuminating flare composition as set forth in claim 1 wherein said alkali metal nitrate is cesium nitrate and said composition upon burning generates maximum emission in the .85 to 1.2 micron region of the spectrum.

References Cited

UNITED STATES PATENTS

| | | | |
|---|---|---|---|
| 3,130,096 | 4/1964 | Pruitt et al. | 149—19 |
| 3,258,373 | 6/1966 | Douda | 149—19 |
| 3,411,963 | 11/1968 | Douda | 149—19 |
| 3,490,966 | 1/1970 | Hiltz | 149—61 X |
| 3,650,856 | 3/1972 | Artz | 149—61 X |
| 3,682,727 | 8/1972 | Heinzelmann et al. | 149—61 X |
| 3,676,236 | 7/1972 | Klima et al. | 119—43 X |

CARL D. QUARFORTH, Primary Examiner

E. A. MILLER, Assistant Examiner

U.S. Cl. X.R.

149—43, 44, 61